United States Patent [19]
Müller et al.

[11] 3,974,871
[45] Aug. 17, 1976

[54] ANTI-SKID TIRE CHAIN

[75] Inventors: Anton Müller, Unterkochen; Hubert König, Aalen, both of Germany

[73] Assignee: Eisen- und Drahtwerk Erlau Aktiengesellschaft, Aalen, Germany

[22] Filed: Jan. 27, 1975

[21] Appl. No.: 544,559

[30] Foreign Application Priority Data
Jan. 29, 1974 Germany............................ 2404055

[52] U.S. Cl................................ 152/220; 152/219; 152/232; 152/239
[51] Int. Cl.².......................................... B60C 27/06
[58] Field of Search ........... 152/220, 231, 232, 233, 152/170, 171, 173, 178, 180, 239, 240, 241, 219

[56] References Cited
UNITED STATES PATENTS

| | | | |
|---|---|---|---|
| 1,021,727 | 3/1912 | Peterson............................ | 152/220 |
| 1,253,113 | 1/1918 | Weed................................. | 152/220 |
| 1,618,941 | 2/1927 | Meade............................... | 152/219 |
| 2,705,520 | 4/1955 | Erving............................... | 152/219 |
| 3,547,177 | 12/1970 | Valley............................... | 152/220 |
| 3,603,371 | 9/1971 | Müller.............................. | 152/239 |
| 3,631,912 | 1/1972 | Rieger et al. .................... | 152/239 |
| 3,768,533 | 10/1973 | Gower ............................. | 152/239 |
| 3,768,536 | 10/1973 | Rieger.............................. | 152/239 |

Primary Examiner—Drayton E. Hoffman
Attorney, Agent, or Firm—Walter Becker

[57] ABSTRACT

An anti-skid tire chain, especially for dual tires in which the chain has a tread part for engaging the tread of each tire and an intermediate part between and connected to the tread parts. Each part of the chain is formed of rings and chain links connecting the rings and clamping means is provided for clamping the chain in place on a set of dual tires.

6 Claims, 5 Drawing Figures

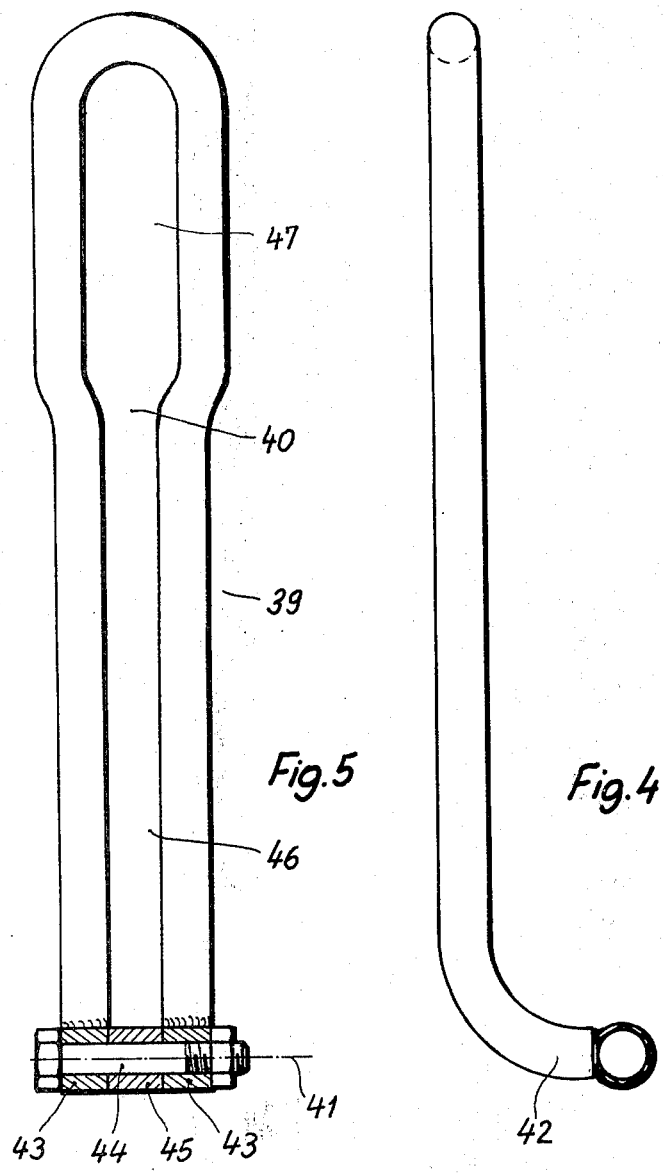

ANTI-SKID TIRE CHAIN

The present invention relates to anti-skid tire chains for dual tires which have a flexible tread part and side parts for contacting the outwardly facing sides of the two individual tires, the tread part having side-tread parts for contacting the individual tires which side-tread parts join the side parts together.

Heretofore, only a few vehicles with dual tires could be provided with protective ground or anti-skid tire chains as such chains can be securely fixed to the tires only with great difficulty. Furthermore, due to the small distance between the individual tires, it is also frequently not possible to provide each individual tire with a separate anti-skid chain.

The invention is based on the problem of designing an anti-skid tire chain of the above described type in such a way that even with comparatively large overall widths for the dual tires a secure holding of the anti-skid chains thereon will be insured.

The above problem has been solved according to the invention, by providing the tread part between its side-tread parts with an intermediate part continuous over its length closed in the operating state and substantially non-expandable with regard to its length which intermediate part is articularly connected to the side tread parts. This intermediate part is tensioned upon fixing of the mounted anti-skid tire or upon rotation of the twin tire by centrifugal force, thereby insuring a very secure holding of the anti-skid tire. The intermediate part which, due to its non-expandable design, has a fixed diameter which is either equal to the outer diameter of the twin tire or smaller, acts like a centrifugal force brake.

According to a further feature of the invention, the intermediate part lies parallel to the longitudinal direction of the tire chain, preferably being annular in the working state so that, in a simple manner, a non-expandable design can be achieved.

A still further improvement results if the intermediate part has an intermediate strand, in particular an intermediate chain, running without change of direction, since a very light construction from the point of view of weight results.

The intermediate part may, however, also be formed by a strip-like chain net which is formed, preferably on at least one longitudinal side, by the side-tread parts so that also the intermediate part may exercise a certain gripping action on the roadway.

It is particularly advantageous if the intermediate part on each longitudinal side is connected to the side-tread parts via chain parts lying one behind the other and if the chain parts, respectively, have two V-shaped connecting members engaging in a joining ring lying in respect of one another which connecting members lie at an angle to one another diverging towards the appropriate side part. For example, these chain parts may be formed like three-pointed stars in which three connecting members engage in one jointing ring member with one connecting link being connected to the intermediate strand while the other two are connected to the side tread parts.

In a further construction of the invention, the intermediate part has center jointing rings lying one behind the other in the longitudinal direction of the tire chain in which jointing rings engage in star-like manner as to at least four center connecting links with at least two of such links engaging outer jointing rings of the side-tread parts lying on the longitudinal sides of the intermediate part so that a satisfactory articulation of the connection between the intermediate part and the side-tread parts results.

In order to reduce still further the expansibility of the tread part in the area of the intermediate part, adjacent outer jointing rings are connected to one another by means of at least one outer connecting link.

It is feasible for center connecting links to lie at an angle of about 45° obliquely to the longitudinal direction of the tire chain and thereby to render possible a high degree of flexibility also of the intermediate part. It is, however, also possible in an advantageous manner, for center connecting links to lie in the longitudinal direction and/or at right angles to the longitudinal direction of the tire chain whereby an expansibility of the intermediate part under traction load can be completely excluded for all practical purposes.

According to a further feature, outer connecting links which lie on the same longitudinal side of the intermediate member connect to one another the appropriate center connecting members of adjacent center jointing rings whereby preferably only a single outer joint link is provided so that also then a very rigid construction of the intermediate member results if this has a comparatively loose structure.

The intermediate member may, for example, form chain configurations with the side-tread parts the surface size of which is greater than that of the configurations of the side-tread parts so that a reduction of the weight of the anti-skid tire chain results.

It is particularly advantageous if the intermediate part forms hexagonal chain configurations with the side-tread parts, whereby preferably the side tread part has substantially hexagonal chain configurations which may be almost rhomboidal; with rhomboidal constructions the chain meshes bordering each side-tread part on both sides also form squares.

In a particularly narrow mesh construction of the tire chain the intermediate part forms with the side-tread parts square chain configurations, alternate jointing rings of the intermediate strand receiving, in addition to the connecting links of the intermediate strand, four further connecting links which are connected to the side-tread parts.

As between the inner side of the inner individual tire of the dual tires and the chassis of the vehicle there is, for the most part, only a minimum space, it is expedient if guide rings provided on the inner side part of the chain tire and through which a clamping chain is drawn are flat-oval in shape. The clamping chain may be guided directly in these guide rings.

Likewise, in order to take into account the minimum passage between the tires and the chassis there is provided, according to the invention, a detachable clamping lever for the inner clamping chain which preferably has a bearing member designed as a push-in bolt for the detachable mounting on any desired member of the jointing rings of the side parts, for example, on the jointing rings of a side chain of the side part and may be removed again after the clamping and may be utilized for a subsequent clamping.

The invention will now be described further, by way of example only, with reference to the accompanying drawings illustrating several embodiments thereof, the parts necessary for the invention being shown almost true to scale, and in which:

FIG. 4 shows, in side elevation, a clamping lever for the anti-skid tire chain of the invention.

FIG. 5 shows a front elevation of the clamping lever shown in FIG. 4.

Figure 1:
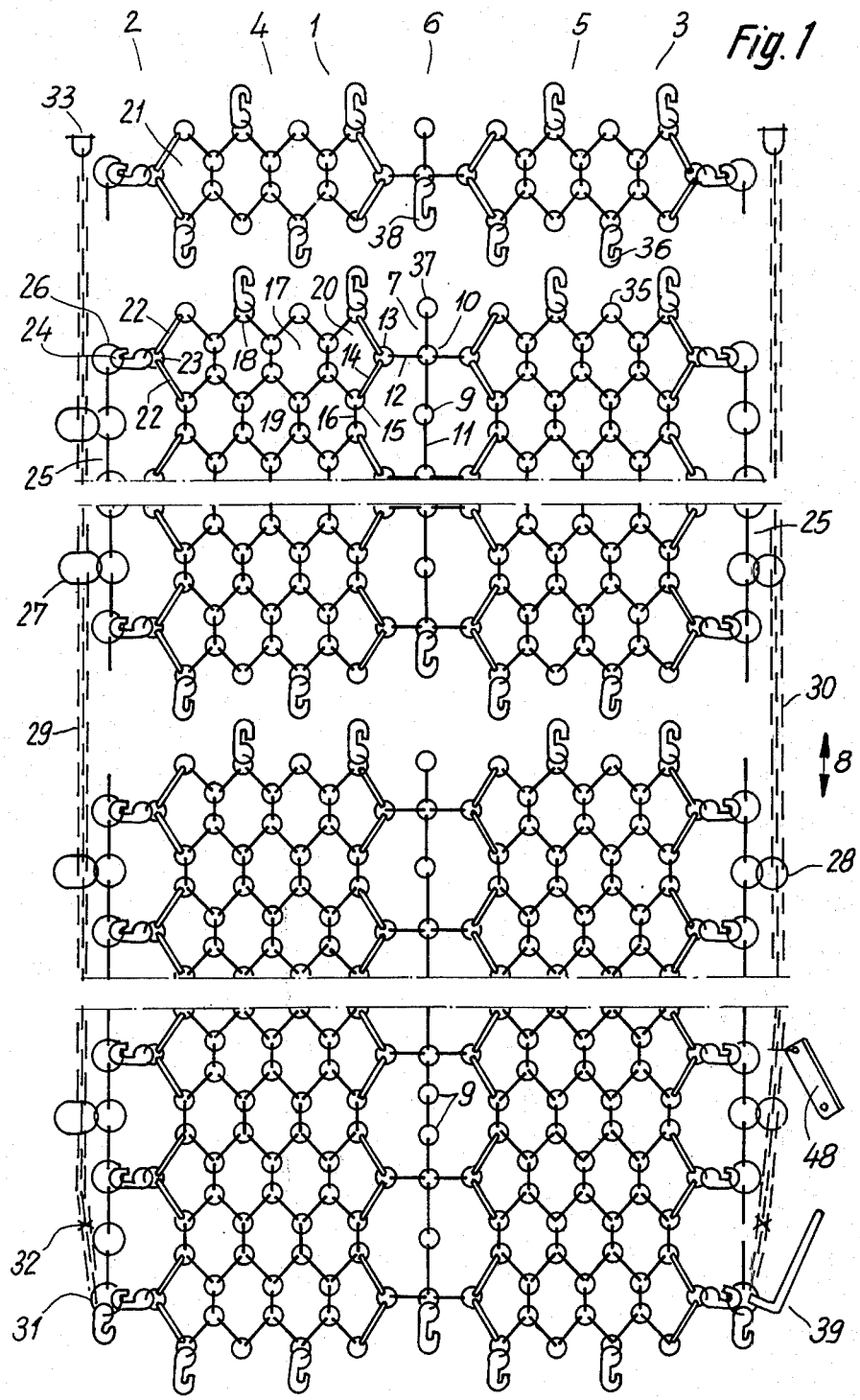
FIG. 1 shows in elevation, a tire chain designed in accordance with the invention.

Referring now to the drawings and particularly to FIG. 1, an anti-skid tire chain designed in accordance with the invention has a tread part 1 and two side parts 2, 3, the whole combining together to form a chain net. Tread part 1 is formed essentially by two side-tread parts 4, 5 and an intermediate part 6 articularly connecting such side-tread parts, the parts 4 to 6 extending over the whole length of the tire chain.

The intermediate part 6 has a continuous intermediate strand 7 formed as a chain which, when the anti-skid chain is pulled to length, extends parallel to the longitudinal axis of the anti-skid chain (arrow 8). The intermediate strand 7 is formed essentially by jointing rings 9, 10 and by connecting links 11, in the form of bridge-piece members, extending between successive jointing rings 9, 10. The jointing rings 10 are uniformly distributed in the longitudinal direction of the intermediate strand 7, and, in addition to the connecting links 11, such rings 10 also receive further connecting members 12, in the form of bridge-piece members, arranged at right angles to the longitudinal direction, arrow 8, of the tire chain and one at each side of the jointing rings 10, into engagement therewith. At their outermost ends, the connecting members 12 engage jointing rings 13, which latter may be of a like kind to the jointing rings 9, and 10, respectively and which furthermore have two further connection links 14 arranged in mutually divergent disposition towards the appropriate side parts 2 and 3, respectively, of the anti-skid tire chain. Each jointing ring 13 forms, with the three connecting links 12, 14 engaged therewith, a star-shaped suspension for connecting the intermediate strand 7 to the appropriate side-tread parts 4 and 5, respectively, the connecting links 14, at that end thereof remote from the appropriate jointing ring 13 engaging a further jointing ring 15 of the appropriate side-tread parts 4 and 5, respectively, jointing rings 15 being conveniently of the like form to jointing rings 13. Adjacent jointing rings 15 which receive connecting links 14 of two successive jointing rings 13 are connected to one another by means of a single tread member 16 lying the longitudinal direction of the tire chain, such tread member conveniently being formed by a bridge-piece member.

The side-tread parts 4, 5 have substantially hexagonal chain configurations the extension of which, in the longitudinal direction of the tire chain, is slightly greater than that at right angles thereto, and the bridge-piece member 19 connecting such configurations are joined to annular members 18 there being an annular member 18 at each end of a hexagonal adjacent member 18 of successive hexagonal configurations being connected by a single bridge-piece member. The annular members 18 may be of a like form to the jointing rings 13, 15 and the bridge-piece member 19 of a like form to the connecting members 12. The connecting members 14 form, with the appropriate members of the respective side-tread part 4 and 5, pentagonal chain meshes 20.

On the longitudinal side of the respective side-tread part 4 and 5 respectively remote from the intermediate part 6 there are provided likewise pentagonal chain meshes 21, the two outer sides of such chain meshes 21 being formed by connecting links 22 engaging in annular members, the connecting links being mutually divergent at an obtuse angle the chain meshes 21 being arranged in alignment with chain meshes 20 transversely of the tire chain.

In that annular member in which the connecting links 22 jointly engage, a third connecting link is provided which is formed, for example, as a detachable hook 24 extending at right angles to the longitudinal direction of the tire chain. Such hook 24 is connected to an annular member 26 of an appropriate side-chain 25. Side-chain 25 comprises a chain strand consisting for example, of ring members and bridge-piece members interconnecting such ring members, the chain strand, when extended, running in a straight line longitudinally of the tire chain. Guide rings 27 and 28 are provided on selected ones of ring members 26 of the respective side-chain 25 for guiding clamping chains 29 and 30 respectively such clamping chains conveniently being formed by flat-oval chain links. The guide rings 27 for the inner clamping-chain 29 are conveniently of flat-oval shape while the guide rings 28 for the outer clamping-chain 30 are circular. One end of each clamping chain 29 and 30 is fixed on an end link 31 of the appropriate side-chain 25, while each clamping-chain has adjacent to end link 31 a clamping-chain lock 32. On the other end, the clamping-chains 29 and 30 each carry a respective shackle 33 or a similar connecting means.

In the embodiment shown, the tire chain is composed of a plurality of chain mats 34 arranged in succession longitudinally of the total structure and positioned between the side-chains 25, the chain mats being detachably secured together by means of hook members 36 and 38 respectively engaging the jointing rings 35 and 37. In addition, the chain mats 34 are detachably secured to the side chain 25 by means of hook members 24. In the area of side-tread parts 4 and 5 each chain mat 34 alternately presents jointing rings 35 and hook members 36 so that when the chain mats 35 are assembled there results at their abutting places practically the same chain meshes as within the body of the chain mats 34. The intermediate strand 7 is divided correspondingly to the chain mats 34 in such a way that each chain mat 34 has a section of the intermediate strand 7, one end of the intermediate strand section carrying a jointing ring 37 and the other end carrying a cooperable hook member 38, so that successive sections of strand 7 might be joined together on mutual jointing of chain mats 34. Between successive jointing rings 10 of the intermediate strand 7, which receive the connecting links 12, there may be arranged two connecting links 11 and a single jointing ring 9 or two or more jointing rings 9 and a corresponding number of connecting links 11.

Figure 2:
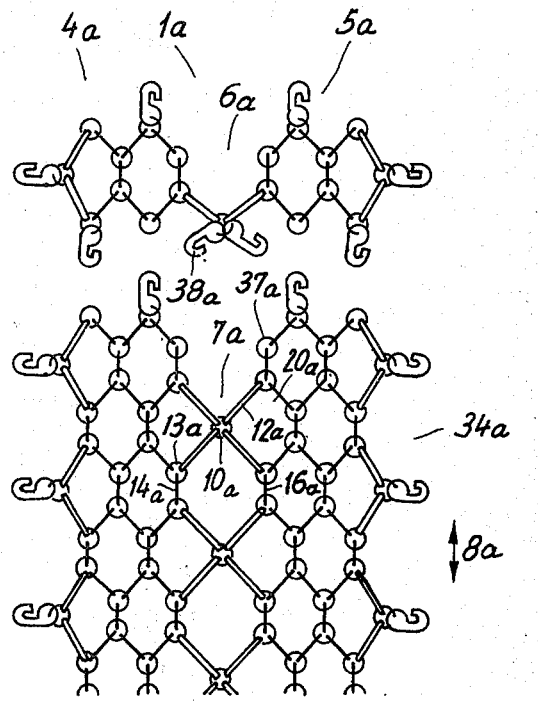
FIG. 2 shows an elevational view of the tread part of a further embodiment of the invention.
Figure 2:
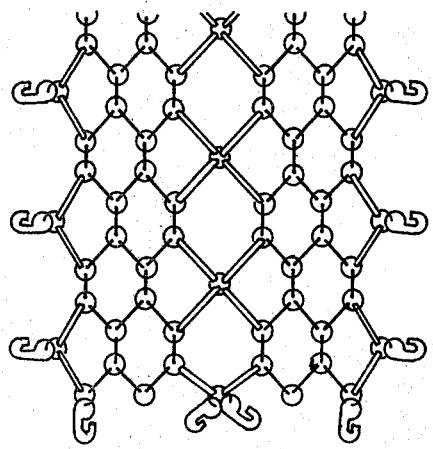
Figure 3:
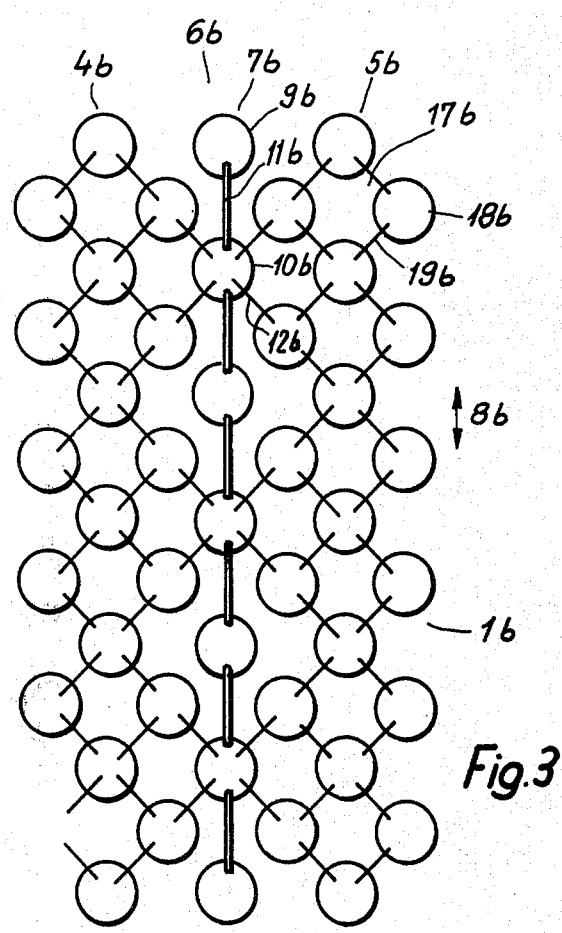
FIG. 3 is a view of a still further embodiment of a tread part according to the invention.

In FIGS. 2 and 3, like references are used to those of FIG. 1 for the same or similar parts, but are modified by the addition of the suffix $a$ or $b$ respectively.

Referring now to FIG. 2, the intermediate part 6a of the tread-part 1a has no intermediate strand passing through the tire chain in the longitudinal direction of the total structure, arrow 8a, but is formed essentially by a star-shaped suspension 7a the connecting rings 10a of which lie generally centrally of the intermediate part 6a in the transverse direction thereof and one behind the other in the longitudinal direction thereof, each ring 10a receiving four connecting links 12a into engagement therewith, the links 12a being inclined at 45° to the longitudinal direction, arrow 8a, of the tire chain. The two connecting links 12a of each jointing ring 10a lying to one side of the longitudinal line of symmetry of the intermediate part 6a form with the appropriate side-tread part 4a and 5a, respectively, a pentagonal chain mesh 20a. The respective inwardly facing pairs of connecting links 12a of two successive jointing rings 10a form, together with the side-tread parts 4a, 5a a hexagonal chain mesh. At one end of each chain mat 34a the appropriate jointing ring 10a has two hooks 38a for cooperation with two ring members 37a of the adjacent chain mat 34a.

By means of the design illustrated in FIG. 2, during the mounting of the tire chain a particularly advantageous stretching of the intermediate part 6a in the longitudinal direction, arrow 8a, is possible as the connecting links 12a may be displaced from the position of use as shown in FIG. 2 into approximate alignment with the longitudinal direction, arrow 8a, when the tire chain is free from lateral tensions; thus two connecting links 12a forming an angle of 45° with the longitudinal direction of the chain in the position of use of the tire chain may be directed either at a smaller angle than 45° relative to the longitudinal axis or may abut one another. Thus the tire chain may first of all be conveniently laterally collapsed in the area of the middle part 6a over the periphery of the tire so that by abutment of the ends of the tire chain, the appropriate hook members 38a and the ring members 37a may be connected to one another. Only then is the side-tread part 4a lying on the inside of the tire and the outer side-tread part 5a secured. In this way the tire chain, which, in consequence of the design is highly flexible is tensioned crosswise to its longitudinal direction, arrow 8a, so that the middle part 6a takes up the position of use shown in FIG. 2, with the connecting links 12a lying approximately to 45° to the longitudinal direction of the tire chain, the adjustment of the connecting links 12a into this position leading to a shortening of the middle part 6a and thus to a reduction of the diameter which the middle part 6a can take-up so that the requisite securing results. A strong clamping of the tire chain after location is possible by means of the clamping chains described with reference to FIG. 1.

With the embodiment shown in FIG. 3, the intermediate part 6b again has a continuous intermediate strand 7b, each alternate jointing ring 10b of this intermediate strand 7b receiving four connecting links 12b such links lying at 45° to the longitudinal direction, arrow 8b, of the tire chain and being formed by bridge-piece members and tread members respectively of the side-tread parts 4b, 5b, which have substantially exclusively square and quadratic chain meshes 17b respectively, the sides of such meshes being formed by a single bridge-piece member 19b.

As FIG. 1 furthermore shows, for clamping the clamping chain 29, 30 of the tire chain, a clamping lever 39 capable of being dismantled and detached is provided which can be mounted on any desired ring member 26 of the respective side chain 25. As can be seen from FIGS. 4 and 5, the clamping lever 39 has a longitudinal slit 40 extending substantially over its whole length, the slit being formed in an arched rod made of round steel wire. One end of the clamping lever 39 forms a pivot 41 for clamping of the clamping chain by pivoting the clamping lever 39, the end of the clamping lever 39 lying adjacent this pivot axis 41 being bent at an angle about an axis parallel to the pivot axis 41 and comprising the two spaced leg ends 42 of the rod. At each leg end 42 there is fixed a bushing 43, for example, by welding, the aligned bores of the two bushings 43 receiving an insert bolt 44 for axial location therein by a nut. Between the bushings 43 there may be provided a detachable distance piece 45 in the form, for example, of a bushing placed on the bolt 44 so that the bushings 43 may be clamped against one another with the bolt 44. By removal of the bolt 44 and the distance piece 45 the clamping lever 39 can be mounted on an annular member of the respective side chain 25 or released from such member. Slit 40 extends from the pivot 41 and has a narrower slit section 46 of a width which is slightly greater than the thickness of the members of the clamping chain 29 and 30 but smaller than its width. At its end farthest from the pivot 41, slit section 46 merges into a wider slit section 47 the width of which is greater than that of the chain members of the clamping chain 29, 30 and through which, therefore, the clamping chain can be drawn. For tightening the respective clamping chain, this is first drawn through the slit section 47 as far as possible by hand, whereon it is pushed into the slit section 46 so that it is connected in its longitudinal direction to the clamping lever 39 in a positive locking manner. The clamping chains 29, 30 can then be clamped by pivoting the clamping lever 39 about its pivot 41 and, for example, secured with the clamping lock 32. The clamping lever 39 may, when not in use, remain in the outer side chain 25 and be secured in its clamping position to a securing member 48 in accordance with FIG. 1.

It is, of course, to be understood that the present invention is, by no means, limited to the specific showing in the drawings but also comprises any modifications within the scope of the appended claims.

What is claimed is:

1. An anti-skid tire chain for dual tires collectively having a length at most as great as the tire circumference comprising; a tread part for engaging each tire tread, side parts connected to the axially outer edges of the tread parts for engaging the axially outer sides of the tires, an intermediate part extending laterally between and interconnecting said tread parts and also extending throughout the length of the chains, said intermediate part being flexibly connected to said tread parts and expandable at least in a transverse direction and being substantially restricted in the direction of the length of the chain, said intermediate part including a chain strand which extends in the circumferential direction of the tires when the chain is mounted thereon, said intermediate part including a chain net which extends in the circumferential direction of the tires when the chain is mounted thereon, said chain net being connected at the side edges to spaced points along the adjacent axial edges of said tread parts of the chain, said intermediate part including chain means, each tread part along the edges adjacent said intermediate part having pairs of chain links which are spaced along the said edges, the links of each pair converging toward the intermediate part, and a ring member to which each pair of chain links and a corresponding point on the intermediate part are connected, said tread parts being formed of interconnected chain links and forming chain configurations, said intermediate part also being formed of interconnected chain links and forming chain configurations of a size greater than those of the tread parts.

2. An anti-skid tire chain according to claim 1, in which said intermediate part includes chain means, each tread part along the edges adjacent said intermediate part having pairs of chain links which converge toward said intermediate part and longitudinal links between the outer ends of each pair, ring members connecting the ends of the longitudinal links to the other ends of the respective pair of chain links, said intermediate part being connected to said ring members, said tread parts being formed of interconnected chain links and forming polygonal chain configurations, at least the sides of said intermediate part forming further hexagonal chain configurations with the adjacent sides of said tread parts, said tread parts and said intermediate part comprising rings and links extending between and connected to the rings, the rings of said intermediate part being one behind the other in the circumferential direction of the chain when mounted, and four connecting links connected at one end to alternate ones of the rings of said intermediate part and extending outwardly therefrom in diverging relation and the other end connected to rings of said tread parts.

3. An anti-skid tire chain according to claim 1, in which said tread parts and intermediate part are segmented, and cooperating elements of hook and ring means on the opposed ends of the segments of said parts.

4. An anti-skid tire chain according to claim 3, in which the axially outer edge of at least one tread part has ring members mounted thereon, and flexible clamping means entrained through said ring members for clamping the chain on a set of tires.

5. An anti-skid tire chain according to claim 4, in which said ring members are oval shaped.

6. An anti-skid tire chain according to claim 4, in which said flexible clamping means has opposed separable ends, a clamp lever pivotally connected to one of said ring members, one end of said clamping means being connected to said one ring member, said lever being engageable with the other end of said clamping means.

* * * * *